B. B. HOTCHKISS.
Machine-Gun.

No. 211,849. Patented Feb. 4, 1879.

B. B. HOTCHKISS.
Machine-Gun.

No. 211,849. Patented Feb. 4, 1879.

Inventor:
B. B. Hotchkiss,
by Munson & Philipp,
Attorneys.

B. B. HOTCHKISS.
Machine-Gun.

No. 211,849.    Patented Feb. 4, 1879.

Attest:
Geo. H. Graham
J. W. Boleschka

Inventor;
B. B. Hotchkiss,
by Munson & Philipp,
Attorneys.

B. B. HOTCHKISS.
Machine-Gun.

No. 211,849. Patented Feb. 4, 1879.

BEST AVAILABLE COPY

B. B. HOTCHKISS.
Machine-Gun.

No. 211,849. Patented Feb. 4, 1879.

Inventor:

B. B. Hotchkiss,
by Munson & Philipp
Attorneys.

UNITED STATES PATENT OFFICE

BENJAMIN B. HOTCHKISS, OF NEW YORK, N. Y.

IMPROVEMENT IN MACHINE-GUNS.

Specification forming part of Letters Patent No. 211,849, dated February 4, 1879; application filed January 8, 1879.

*To all whom it may concern:*

Be it known that I, B. B. HOTCHKISS, of the city, county, and State of New York, temporarily residing in Paris, France, have invented certain new and useful Improvements in Machine-Guns; and I do hereby declare that the following specification, when taken in connection with the accompanying drawings, is such a full, clear, and exact description of the same as will enable others skilled in the art to make and use the same.

In said drawings, Fig. 17 illustrates an improved feed-case.

This invention relates generally to that class of ordnance known as "machine" or "battery" guns, and particularly to such of them as have a multiplicity of barrels that are automatically rotated step by step, loaded with cartridges, the same discharged, and the exploded shells extracted by the rotative movement of a crank-shaft.

The invention consists in providing guns of this class with instrumentalities whereby they may be trained and fired while supported from the shoulder of the gunner.

It further consists in various constructions of the parts, and combinations and arrangements of the same, whereby the manipulation of machine-guns is greatly facilitated; and it includes various improvements upon the structure of machine or battery guns secured to me by Letters Patent No. 130,501, dated August 13, 1872.

The said instrumentalities, constructions, combinations, arrangements, and improvements are all too fully hereinafter pointed out and claimed to need further preliminary description.

In order to a ready understanding of the improvements effected by the present invention, the principal mechanisms of the gun and their operation will first be described.

Figures 2, 3, 4:
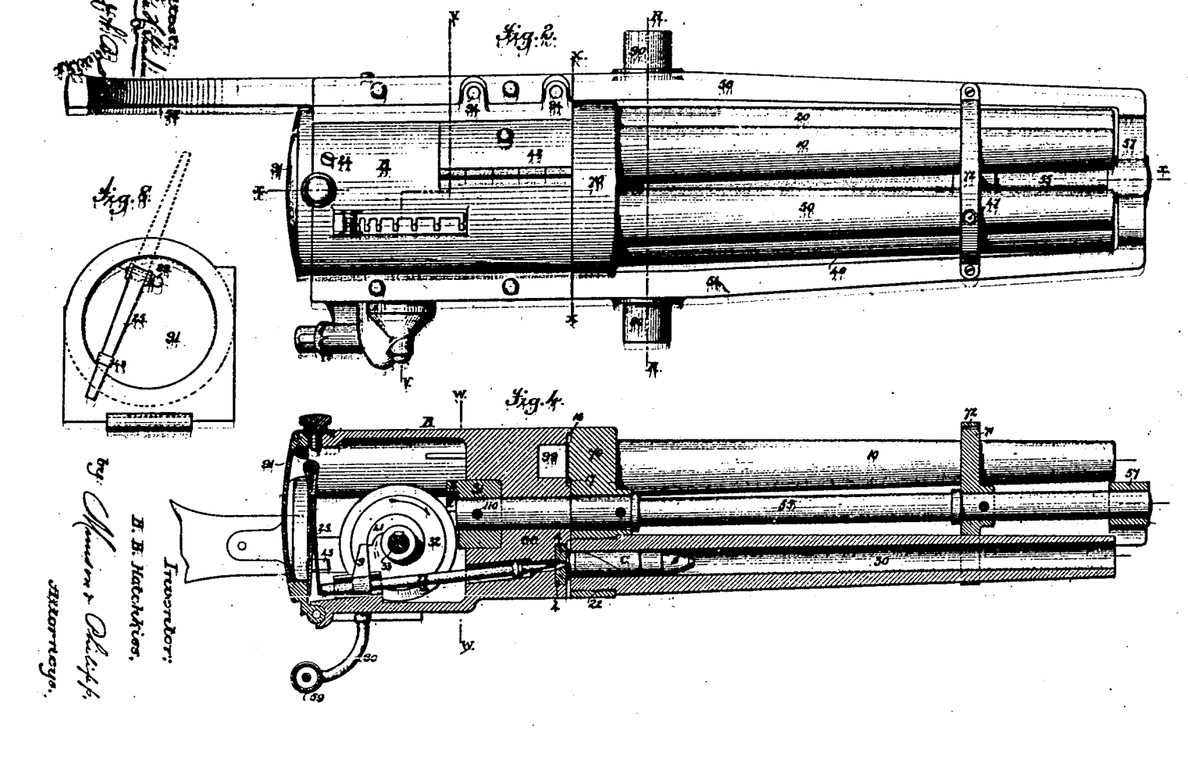
Fig. 2 is a plan view of the same.
Fig. 3 is a front-end elevation.
Fig. 4 is a longitudinal sectional elevation on the lines $x\ x$ of Fig. 2 and P P of Fig. 6.
Figures 5, 6, 7, 8:
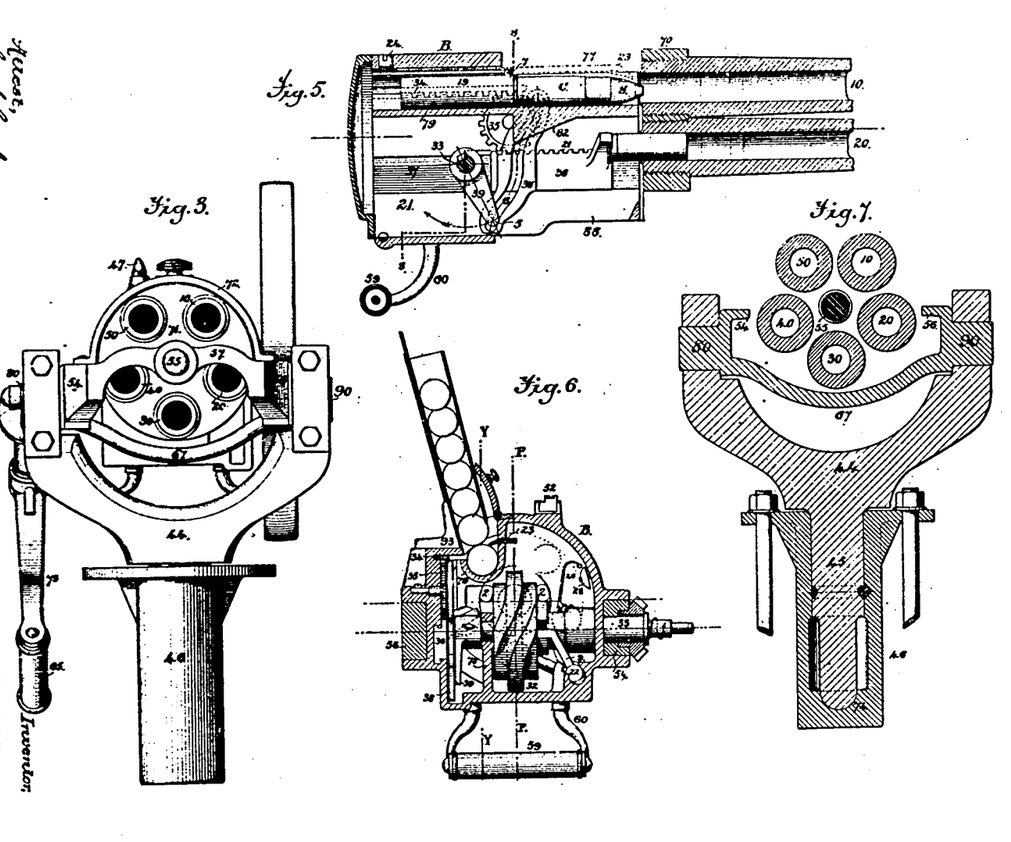
Fig. 5 is a longitudinal sectional elevation on the lines V V of Fig. 2 and Y Y of Fig. 6.
Fig. 6 is a transverse sectional elevation on the line $s\ s$ of Fig. 5 and $z\ z$ of Fig. 9, looking forward, but illustrating the mechanisms in the positions occupied when the crank-shaft has made about a quarter-turn after firing.
Fig. 7 is a transverse sectional elevation on the line R R of Fig. 2, looking rearward.
Fig. 8 is an inside plan view of the door that closes the open rear end of the breech-piece.

The mechanisms for rotating the barrels, loading the same, exploding the cartridges, and extracting and discharging the cartridge-shells are all contained in the breech-piece B, which consists of a casting formed at its rear end with a spacious chamber, Figs. 4, 6, which is adapted for the reception of a portion of said mechanisms, its rear end being closed by a hinged door, 91.

Figure 11:
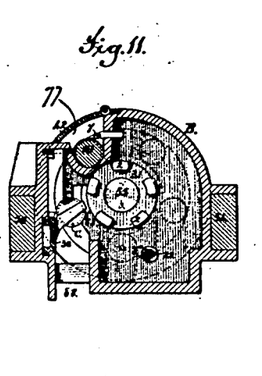
Fig. 11 is a transverse section on the line W W of Fig. 4, looking forward.
Figure 14:
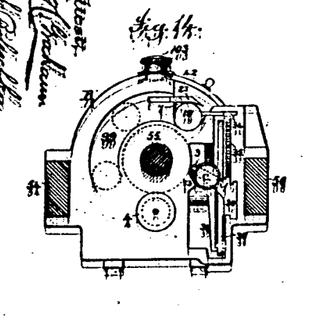
Fig. 14 is a sectional elevation of the gun on the line X X of Fig. 2, as seen looking rearward.

The breech-piece B is provided at one side with guiding bearings and ways for some of the reciprocating parts; at the lower opposite side with a guideway for the firing-pin; at its forward end with a vertical opening, constituting a feeding-recess, 77, provided with a closing-door, 42, and a discharging-opening, 88, Figs. 5 and 11; and its front face is cut away to form a curved guideway, 99, Figs. 4 and 14, which completes the feeding of the cartridges home, as will be hereinafter more particularly explained.

The massive forward end of the breech-piece B, which constitutes the breech-block 66, is perforated in its longitudinal center with a bearing for the reception of the rear end of the longitudinal axis 55.

From this breech-piece B the side frames 54 56, rigidly secured thereto, extend forward and are united together midway by a brace-bar, 67, and at their ends by a cross-bar, 57, which frames are provided at proper points with trunnions 80 90, by which the gun is mounted in a suitable carriage.

The barrels 10 20 30 40 50, of which there may be any number, are mounted in heavy disks 70 71, that are securely attached to the axis 55, the disk 70, in the threaded sockets of which the rear ends of the barrels are secured, conforming in shape to that of the breech-piece B, and fitting in working contact with its front face, and the disk 71 being protected by a guard-plate, 72, which supports the forward sight 47. The barrels thus supported are mounted in place by means of the axis 55, which has its rear end extended through the breech-block 66 and protruded into the chamber in the breech-piece B, where it has fixed upon it a driving-wheel, 31. This wheel is secured to said shaft by means of a pin, 110, which is inserted and driven home when the parts are properly adjusted through a hole, 109, made in the breech-block and closed by a screw, 108. This pin may be driven out to release the parts when they are in the position shown in Fig. 16.

The pins 2 of the driving-wheel 31 are engaged by a worm-wheel, 32, that is fast on a crank-shaft, 33, which is mounted transversely in bearings in one side of the breech-piece B and in a division-plate, 78. The thread of this worm-wheel is partly helical and partly circumferential, the helical portion being about one-half of its whole extent, and having a pitch which is sufficient to rotate the barrels to an extent equal to the distance between two of said barrels.

By the operation of this worm-wheel the circumferential and helical parts of its thread will successively engage the pins 2, thus causing the barrels to remain at rest during one half-rotation of the crank-shaft, and to be partially rotated during the remaining half-revolution of said crank-shaft, the purpose of which operation will presently appear.

The loading-plunger 19 reciprocates in a guiding-bearing partly formed by the curved division-plate 70, and has projecting on one side a rack-bar, 34, that runs in a guideway, so as to engage with a pinion, 35, whose axis is fixed in one side of the breech-piece B.

The extractor 36, for withdrawing the exploded cartridge-shell, reciprocates in a guiding-way, 37, and has a rack in its upper edge, which engages with the pinion 35, while to the face of this extractor is secured a yoke, 38, having a curved slot, 6, in which runs the stud or friction-roller 5 on the end of a crank-arm, 39, that is fast on the crank-shaft 33, which latter may be furnished with a suitable crank. The structure and arrangement of these parts are such that as the crank-shaft 33 is turned the end of the crank-arm 39, traveling in the curved slot of the yoke 38, will cause the extractor 36 to reciprocate horizontally in one direction, and the rack 21, through the pinion 35, will cause the loading-plunger 19 to reciprocate horizontally in the opposite direction. The slot 6 in the yoke is so curved as to give a considerable period of rest to the loading-plunger and extractor at each end of their strokes, which, however, is more particularly set forth in the application for United States patent filed by me January 31, 1877.

The firing-pin 22 slides in a suitable guideway in the breech-piece B, and has an arm, 9, projecting toward the crank-shaft 33, where it is controlled by a cam, 41, carried by said shaft, or formed on one side face of the worm-wheel 32, which cam moves said firing-pin rearwardly and permits its being suddenly impelled forward by the action of the main-spring 25, that bears against its end and the inner face of the door 91.

A cartridge-controlling gate, 23, is pivoted at its rear end on a screw, 24, and arranged to horizontally vibrate in a suitable guideway provided in the breech-piece B, in a plane above that occupied by the loading-plunger, its movements being imparted by the loading-plunger, which carries at its forward end a projecting pin, 7, that runs in a guiding-groove, 8, cut into the under side of the said gate 23.

A cartridge-feeding trough, 92, open at both ends, is provided with knees 93, from which depend pins that enter sockets 94 in the side frame 56, whereby it is supported in place when the door 42 is opened, and thus is adapted to coincide in position with the feeding-recess 77, and extend the same upwardly.

Figure 9:
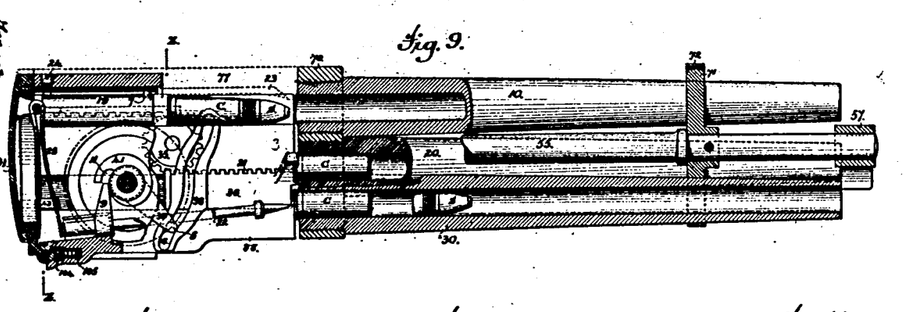
Fig. 9 is a longitudinal sectional elevation, such parts being removed as, overlying the same, obstruct a view in elevation of the several instrumentalities in the positions they occupy at the moment of firing.

The mechanisms thus far described, and which in their structure, except as hereinafter pointed out and claimed, are substantially like those contained in my Patent No. 130,501. Their operation is as follows: It is to be understood that the ammunition designed to be used is in the form of a cartridge, consisting of a shot, shell, or inclosed shrapnel, as S, properly secured in the end of a cartridge-shell, C, that is loaded with a suitable charge of powder, and provided with a priming capable of ignition by the forcible impact of the firing-pin 22. A number of such cartridges being laid one upon another in the feeding-trough 92, the lowermost one will descend through the feeding-recess 77 and rest upon the floor of the loading-chamber, constituted by the forward portion of the guideway in which the loading-plunger reciprocates, as in Figs. 5 and 6. As suming the crank-shaft 33 to be revolving in the direction indicated by its arrow, and the mechanisms to be in the positions they occupy just after the gun has been fired, as in Fig. 9, at which time the stud 5 on the crank-arm 39 will be in the act of finishing its downward movement in the lower curved part of the groove 6 in the yoke 38, the stud 5, then entering into and traversing the lower extremity of the slot 6, reverses and moves upward in the lower curved portion of said slot, thus forcing the yoke 38 rearward, carrying with it the extractor 36, and causing, through its rack 21, the pinion 35 and the rack 34, the loading-plunger 19 to move forward and to insert the cartridge C S into the firing-chamber of one, 10, of the barrels, and at the same time, through the operation of the pin 7, projecting from the plunger 19 into the slot 8 of the cartridge-controlling gate 23, to vibrate the same sidewise underneath the pile of cartridges, to raise and support them, and prevent their moving downward into contact with the cartridge being fed forward.

During this forward reciprocating movement of the loading-plunger 19 and corresponding rearward movement of the extractor 36, the circumferential part of the thread of the worm-wheel 32 will have engaged the pins 2, thus holding the barrels stationary, in which condition they will remain until the yoke 38 has reached the extent of its rearward reciprocation, and its stud or friction-roller 5 is traveling up through the upper curved part of the slot in the yoke, which now stands in a position coinciding with the arc of movement described by said stud 5, whereby the yoke 38, standing still, imparts no motion to the extractor 36 or loading-plunger 19.

A continued movement carries the stud 5 into the upper extremity of the slot 6, which it traverses, and, passing its center, again moves downward in the upper portion of said slot, thus causing the yoke to move forward, carrying with it the extractor, and moving the loading-plunger rearward, the loading-plunger at the same time vibrating the cartridge-controlling gate 23, so as to uncover the feeding-recess 77, and permit the cartridges to descend in the feeding-trough 92, and the lowermost one to rest in the loading-chamber. The extractor and loading-plunger stand in their last-described positions while the stud 5 is traveling down the lower curved part of the slot in the yoke without moving the same, for the reason that said portion of the slot 6 now stands in a position coinciding with the arc of movement described by said stud 5. During these movements of the parts—that is, while the stud 5 is finishing its movement in the upper curved part of the slot 6, traverses the upper extremity of said slot, reverses, and moves downward therein, and travels through the lower curved part of the slot—the helical portion of the thread of the worm-wheel simultaneously engages the pins 2, and causes the barrels to revolve with the axis 55 to an extent equal to the distance between two of the barrels. The barrel 10, that has just received the cartridge C S, is thus carried into the position previously occupied by the barrel 50, which brings the barrel 20 into the loading position, or that just vacated by the barrel 10.

When the barrels assume a state of rest, which is when the mechanisms stand as in Fig. 4, the arm 9 of the loading-plunger is just about to pass off the higher part of the cam 41; and as the movement of the crank-shaft is continued, said cam 41 is caused to release the firing-pin, which is instantly impelled forward by the mainspring 25 to strike a percussive blow upon the cartridge in the barrel 30, and explode the same.

The rearward movement of the extractor and simultaneous forward movement of the loading-plunger then begin, and the operations described are repeated.

It will be observed that during about one-half of a single revolution of the crank-shaft 33 the loading-plunger 19 is moved forward to insert a cartridge into one of the barrels, at the same time vibrating the cartridge-controlling gate 23, to enter beneath and support the mass of cartridges in the feed-trough 92, and that the extractor is moved simultaneously rearward; and that during the next half-revolution of said crank-shaft the plunger 19, extractor 36, and gate 23 make their reverse movements, while the barrels are simultaneously revolved a distance equal to the space between the centers of two of them.

The forward movement of the plunger 19 does not completely insert the cartridge in the barrel, but leaves the same protruding a slight distance rearward, and said cartridge is forced to its seat in the barrel by means of the curved guideway 99, Figs. 4 and 14, against the wedge-like rear face of which the head of the cartridge travels as the barrels are rotated. In order that the cartridge fed forward shall be positively carried into the guideway 99 as the barrels rotate, the lost motion of the crank-arm 39, in the curved upper portion of the slot 6, permits the plunger to stand still in the forward end of its stroke while the barrels begin their rotation, thus enabling the plunger to support the cartridge until it is entered into and within the control of said guideway. This feature of the operation is an important one, as it prevents the cartridge from following the plunger backward when the gun is considerably elevated. The lost motion of said crank-arm while running in the curved lower portion of the slot 6 permits the cartridge-shell extractor, which carries at its forward end two solid hooks, 1 3, that lie in the ways 16 17 cut for them in the inner face of the disk 70, to stand motionless in such a position that the flange of the cartridge-shell will be carried between them by the rotation of the barrels.

It will now be understood that, as the plunger is aligned with the barrel marked 10 in Fig. 3, the extractor with the barrel marked 20, and the firing-pin with the barrel marked 30, the cartridges having been fed regularly into the loading-chamber, the following results will be accomplished as the crank-shaft is revolved, viz.: The firing-pin having struck the cartridge in the barrel 30 and discharged the same, the loading plunger moves forward to charge the barrel 10, the retractor moves rearward to withdraw the shell previously exploded in the barrel 20, while the barrels are stationary; and then, as the barrels revolve and the plunger and retractor make their reverse movements, the loaded barrel 10 is carried to the position previously occupied by the barrel 50, thus bringing the empty barrel 20 into alignment with the loading-plunger, the barrel 30, containing the exploded shell, into alignment with the extractor, (carrying the flange of the exploded shell into the embrace of the hooks 1 3,) and the loaded barrel 40 before the firing-pin 22, whereupon the operations are repeated. Thus a barrel is charged with a cartridge, the charged barrel is transferred to the firing-position, a cartridge is exploded, and an exploded shell is extracted at each rotation of the crank-shaft, which automatic operations may be carried on with great rapidity.

When the gun in operation has been regularly fed with cartridges, and it is desired to cease firing, the cartridges remaining in the feeding-trough and loading-chamber may be conveniently removed therefrom by inserting the hand through the recess 75 or 76 cut through the back and front plates of said trough, while the cartridges in the barrels may be ejected through the discharging-orifice 88, without being exploded by the firing-pin, by simply opening the door 91 and revolving the crank-shaft 33.

Machine or battery guns of the class to which that hereinbefore described belongs have heretofore been mounted upon carriages which are provided with an elevating and depressing mechanism, rising from the carriage and bearing underneath the breech-piece B, and with a traversing mechanism connected with the carriage, and the yoke embracing the trunnions. Such arrangements, while advantageous for field-guns and for general service, do not admit of speedy manipulation when it is desired to train the gun upon a constantly moving object.

The instrumentalities whereby a machine or battery gun is adapted to be readily and continuously trained so as to deliver its fire with precision upon a moving object constitutes one branch of the present invention, and will now be particularly described.

Figure 31:
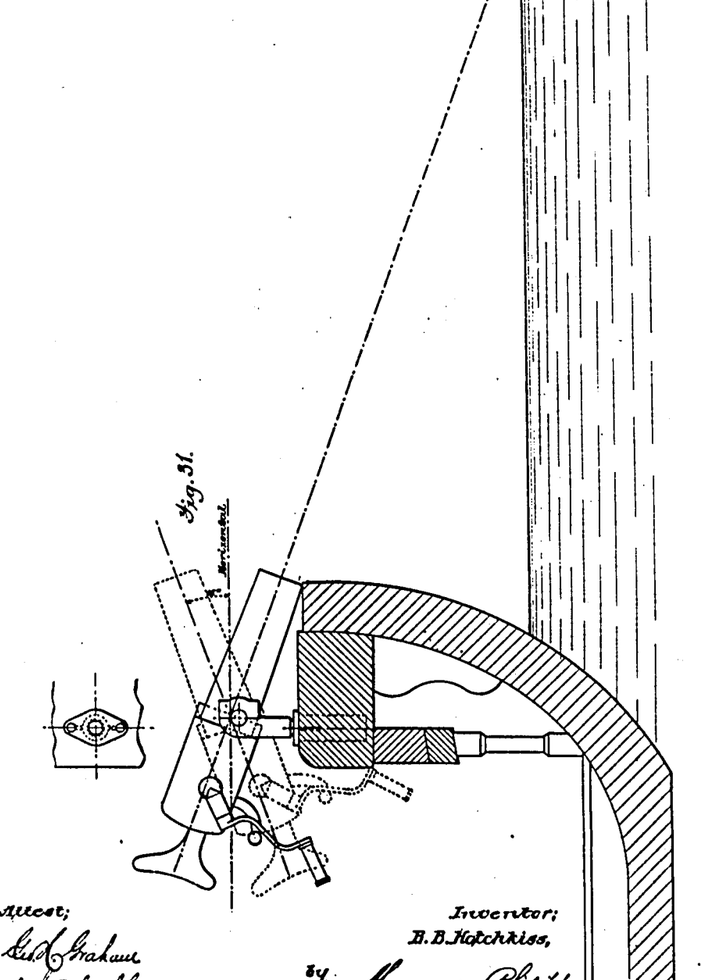
Fig. 31 illustrates the mode of mounting a machine-gun trained from the shoulder.

The trunnions 80 90 are journaled in a yoke, 44, which terminates in a central pintle, 45, adapted to rest in a suitable socket, as 46, which may be secured in the gunwale of a ship or boat, as in Fig. 31, or be mounted upon the crest of a fort, or upon a portable wheeled or other carriage in the usual way. I provide it with a rearwardly-projecting shoulder-piece, 58, preferably extending from the left-hand side frame 56, and with a handle, 59, preferably secured to the under side of the breech-piece B by bent arms 60, which handle is thus hung so as to occupy a central position below the said breech-piece, and project rearward therefrom to a convenient degree. This handle 59 might, however, depend from the shoulder-piece in a convenient position to be seized by the left hand of the gunner. In manipulating a gun provided with this shoulder-piece 58 and handle 59 the gunner places his left shoulder against the shoulder-piece 58, and seizes the handle 59 with his left hand, thus leaving his right hand free to manipulate the ordinary crank which sets in motion the gun mechanisms proper. (See Fig. 10.)

Inasmuch as the gun is mounted upon a universal pivot, and will be nicely adjusted so that it is nearly balanced upon its trunnions, a slight power exerted upon the handle 59 will enable the gunner to raise or depress the gun, as may be desired, the shoulder-piece readily sliding over the shoulder, as may be required. When the desired position is reached, a forward pressure of the body against the shoulder-piece will hold the gun in that position, while permitting the rotation of the crank-shaft to cause the operation of loading and firing of the gun without disturbing said position.

It is obvious, however, that the ordinary means for operating the crank-shaft 33— that is, with a long crank requiring a single turn to make one complete movement of the loading and firing mechanisms, and necessitating a forward and backward motion of the body of the gunner—requires an awkward movement of his body, that not only expends his strength but tends to disarrange his aim.

In order to enable the crank-shaft to be turned by a movement that will not sway the body of the gunner, so as to cause him to move the gun out of position or lose his aim, I have provided the crank-shaft 33 with a bevel-pinion, 61, and arranged an inclined counter-shaft, 62, in a sleeve, 64, secured by a bracket, 66, to the breech-piece, which counter-shaft 62 carries on one end a bevel-pinion, 63, gearing with the pinion 61, and at the other end a crank, 73, the circular path of travel of whose handle 65 nearly intercepts the handle 59. With the crank 73 thus arranged, the gunner may, while grasping the handle 59 with his left hand, raise and lower the gun thereby, at the same time allowing the shoulder-piece to pass up or down against his left shoulder, and, when the desired position is reached, to securely hold the gun in place by a forward pressure of the body against the shoulder-piece 58. With the body thus posed, the crank 73 may be turned by a movement of the right arm that will not sway or otherwise move the body of the gunner.

Figure 10:
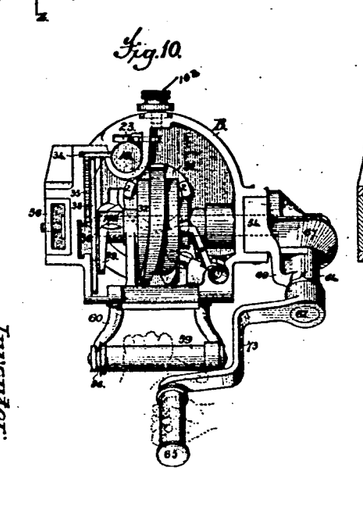
Fig. 10 is a rear-end elevation of the gun with the door removed, the parts being in the positions occupied just before firing.

The relative positions of the handle 59 and the handle 65 of the crank 73 are such that as the crank-handle 65 is brought upward the gunner may, with his left-hand thumb outstretched, as in Fig. 10, intercept said handle and stop the movement of the crank 73, said crank when thus stopped resting in the position which it occupies just immediately before the firing takes place, which firing may then be effected by a slight further movement of the crank, which, it will be observed, is an upward one in, or nearly in, the central vertical plane of the gun.

It will now be obvious that the application of the shoulder-piece 58 and handle 59 to an ordinary gun is within the scope of my invention, which also embraces the improved construction and arrangement of the crank-shaft handle 65, herein shown and described.

Figure 1:
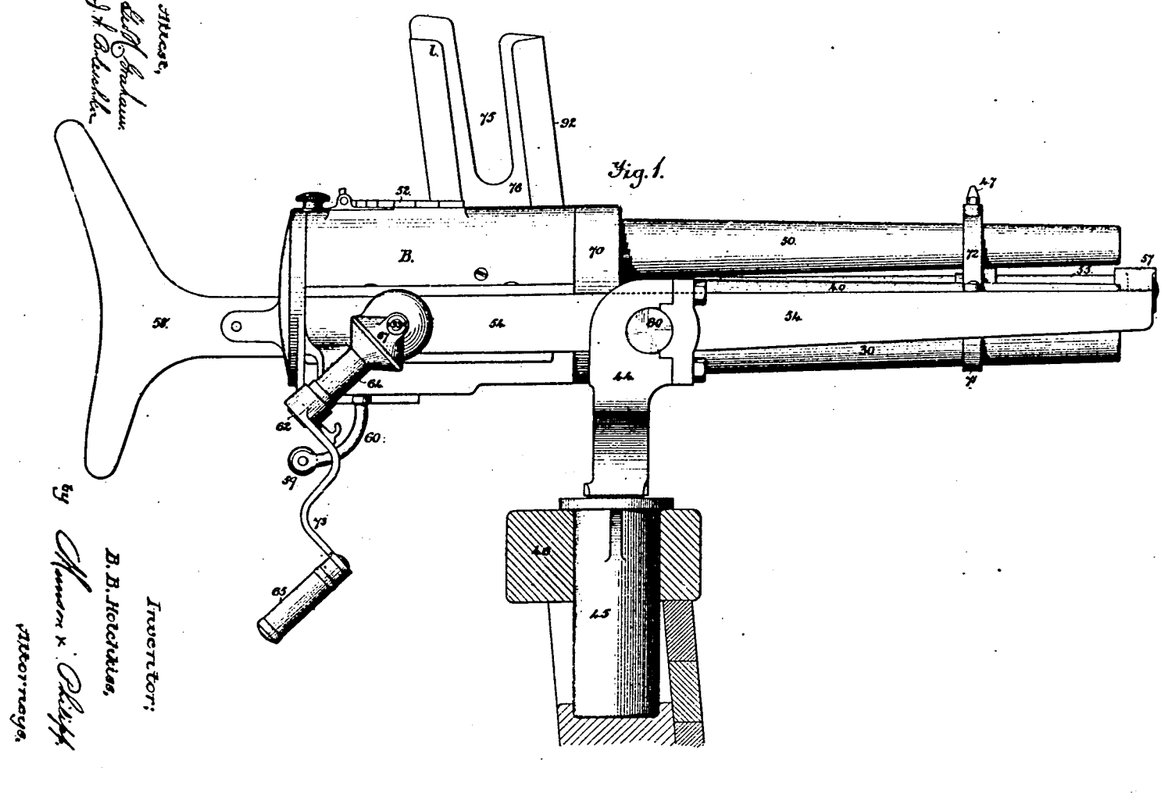
Figure 1 represents, in side elevation, a gun embodying my improvements.
Figure 12:
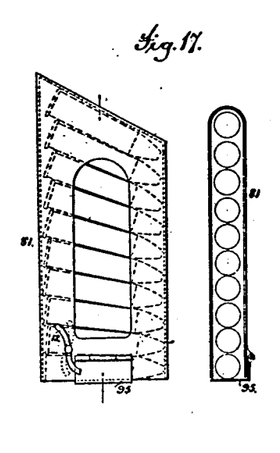
Fig. 12 is a plan view, and Fig. 13 an elevation, of the gun, showing more particularly the arrangement of the crank and shoulder-piece.
Figure 13:
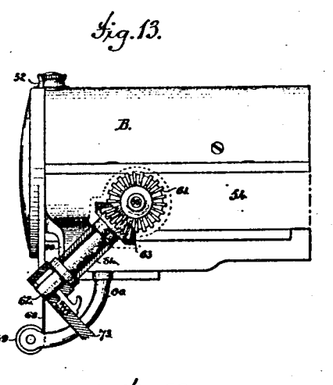

It is apparent that the shoulder-piece 58 may be permanently attached to the gun, as in Figs. 1, 2, 4, or constructed so as to be extensible or detachable. A good construction of the latter forms of it is shown in Figs. 12 and 13, where its shank is divided into two sections, 84, 85, connected together by a sliding joint provided with a holding-screw, 96, having a thumb-nut upon it. The end of the shank has a tenon, 97, that fits in a socket in the side frame 56, where it is held by a spring-catch, which may be released by a pressure upon a bolt, 98.

Figure 21:
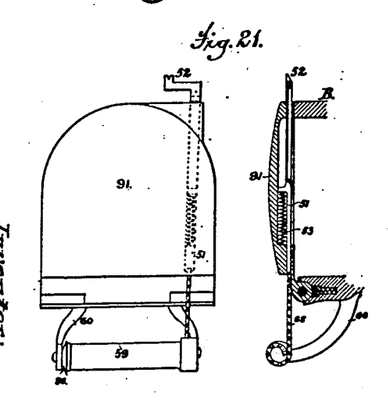
Figs. 21, 22, and 23 illustrate an automatically-adjustable breech-sight.

In machine-guns constructed so as to be trained and fired while supported from the shoulder of the gunner, it is desirable that complete control may be had over the laying, sighting, and firing of the same. To this end I provide the gun with a breech-sight, 52, that may be raised and lowered by the gunner while in the act of working the gun. In carrying out this feature of the invention I have constructed the handle 59 with a rotating sleeve, one end of which is provided with means for communicating motion to the breech-sight, and the other with a frictional device for holding said sleeve stationary in any position of its rotation, and thus holding the sight in a fixed position. (See Fig. 21.) This frictional device consists of a concave disk, 86, interposed between the end of the sleeve and one of the arms 60, pressing equally upon each. Several forms of the means for communicating reciprocating motion to the breech-sight from the rotation of the sleeve of the handle 59 are shown in Figs. 21, 22, and 23. In Fig. 21 the end of the sleeve constitutes a winding-drum, upon which is wound and unwound a chain, 68, attached to the bottom end of the long shaft 51 of the breech-sight 52. This shaft 51 slides in proper bearings in the inner face of the door 91, (it might be in the breech-piece,) where it is seated upon a spring, 63.

Figure 22:
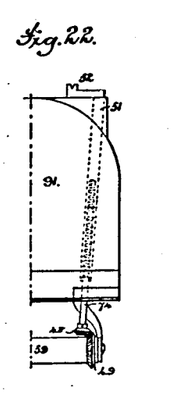

In the modification shown in Fig. 22, the shaft 51, sliding in proper bearings, as before, is provided at its lower end with an internal screw-socket, in which turns a screw-rod, 74, that is provided at its lower end with a bevel-wheel, 48, that gears with a similar wheel, 40, fast on the end of the sleeve of the handle 59. Thus by turning the sleeve its rotary motion will be transmitted to the screw-rod 74, and it will in turn cause the shaft 51 and sight 52 to move up and down, according to the direction given to the rotation of said sleeve.

Figure 23:
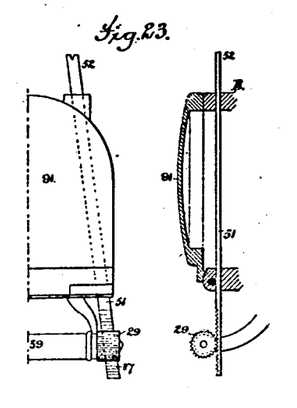

The modification shown in Fig. 23 illustrates the shaft 51 of the breech-sight 52 as guided in bearings in the breech-piece B, and provided with a rack-bar, 87, at its lower end, that gears with a pinion, 29, mounted on the end of the sleeve of the handle 59. This feature of the invention is not, however, limited to the constructions shown, as it is obvious that the same result may be obtained by other mechanisms—as, for instance, an arrangement of levers.

In machine-guns, and particularly one that is constructed so as to be trained from the shoulder, it is often of the highest importance that the approach of the crank in its rotation to that point at which the gun is discharged shall be accurately determined, so that the gunner may temporarily cease rotating the crank and make sure of his aim or the unmoved position of the object to be fired at. This may be effected by an acoustic or an optic signal, the former being preferable, since it does not require that the eye shall be moved off the sights.

In Fig. 6 is shown an arrangement of a bell, 28, within the chamber of the breech-piece, in such a position that just before the firing-point has been reached by the crank-shaft 33 a spring-striking lever, 26, may be tripped by a tappet extending from the crank-shaft. Such tappet might raise and drop a reciprocating plate alongside of the rear sight of the gun; or, as shown in Figs. 10 and 12, the counter-shaft 62 may be provided with a pointer, 18, that, in conjunction with an indicator, 15, marked on the sleeve 64, shows the firing position of the crank.

To secure accuracy in machine-guns it is essential, in order that the gun shall not lose its direction by the movements resulting from its being discharged, that the position of the barrel to be fired shall be in the central longitudinal plane of the gun. This is accomplished in the gun shown in my aforesaid patent; but as there arranged, said barrel while being fired rests above the longitudinal axis of the gun, which necessitates such constructions and arrangements of the parts as to limit their strength, modify their perfect operation, and necessitate an undue exertion of strength in manipulating the gun.

In the present improvement the parts are so constructed and arranged that the barrel to be discharged rests, while being fired, below the longitudinal axis of the gun and in the same vertical plane therewith. The firing-pin is consequently placed in the lower part of the breech-piece and at one side thereof, and is inclined both upward and inward, so that its point is directed toward the center of the bore of the barrel, where it protrudes when impelled forward through a steel face-plate, 4. This firing-pin, therefore, by reason of its being quite close to the cam 41, may have its actuating-arm made quite short, and thus rendered so strong as not to be liable to break when the gun is rapidly manipulated or has been subjected to great wear.

The curved guideway 99, in which the heads of the cartridges slide while being forced home in the barrels as the latter are rotated into the firing position, is made of great length, extending from the loading chamber nearly to the firing position of the barrels before it runs out to the face of the breech-block. (See Fig. 14.) The resistance of the cartridges is thus diminished, and the power required to operate the gun is accordingly lessened.

By the arrangement of the mechanisms so that the barrels are discharged when in the central vertical plane of the longitudinal axis 55 of the gun, and beneath the same, as well as slightly below the plane occupied by the trunnions, the line of longitudinal resistance is brought nearly into the plane of the trunnions, whereby the tendency of the gun to become deranged when it is fired is overcome, since the upward tendency of the recoil is compensated for by the resistance of the weight of the barrels and breech-piece situated above the plane of the trunnions.

The improved cartridge-controlling gate 23 is of such structure that but slight power is required to operate it. It is hung on the pivot 24, and vibrated horizontally by the pin 7 on the loading-plunger while moving in the inclined plane constituted by the curved slot 6. Its edge, curved to conform to the shape of the cartridge, is wedge-shaped in its transverse section, and thus when vibrated in one direction to cut off, raise, and support the mass of cartridges above that one lying in the loading-chamber while the loading-plunger is feeding the latter forward and retreats to free the loading-chamber, it may enter underneath said mass and slightly raise them in the feed-trough without raising the mass of cartridges therein so quickly as to throw the upper one or ones out of said trough.

In former constructions of machine-guns the extractor has been supplied with one or more spring-seated hooks, that spring over the flange of the cartridge-shell as the extractor is carried to its foremost position.

In the present improvement the said extractor is constructed with solid hooks 13, and thus made positive in its action. Thus, when the extractor is in its forward position, as in Fig. 9, where it remains motionless for a considerable period of time, and while the barrels are rotating, its hooks 1 3 lie in the ways 16 17, and stand in planes coinciding with the circular path in which the barrels rotate, and hence will receive the flange of the cartridge-shell in their embrace and firmly hold it, so that it will be positively drawn out of the barrel as the extractor moves rearward.

That the cartridge-shell may be supported until it is clear from the barrel, I provide a supporting-ledge, 83, that projects inwardly from the breech-block 66, at one side of the discharging-opening 88, (see Figs. 11 and 14,) and has a longitudinal extent nearly equal to the length of a cartridge minus its flange, upon which ledge the cartridge-shell rests as it is drawn rearward by the extractor.

In order to insure the ejection of the exploded shell, I have provided a deflector, which consists of a fixed inclined projection, 82, protruding downward from the breech-piece in such a position as to intercept the upper surface of the cartridge-shell as it is drawn out of the barrel and disengage the same from the embrace of the hooks 13, its operation being to force the shell downward through the discharging-channel.

It sometimes happens in the rapid manipulation of the gun that the cartridge-gate, moving more rapidly than gravity will cause the cartridges to descend from the feeding-trough into the loading-chamber, will be forced against the side of the partially-descended cartridge, and, binding upon the same at the instant of firing, clog the parts.

To enable the crank-shaft to be turned backward a slight distance at this time, so as to release such cartridge, a recess, 11, is cut upward in the cam 41, so that in such movement the arm 9 of the firing-pin may, entering the same, form no obstruction to this movement.

It is customary to transport the cartridges for machine-guns in cases 81, the bottoms of which are closed by hinged covers 95, as is shown in Fig. 17. In preparing for firing, one of these cases is usually placed in the mouth of the feeding-trough 92, and then the cover 95 opened to permit the cartridges to pass into said trough. This hand manipulation occasions oftentimes in practice a dangerous delay. To render the operation automatic, the said cover 95 is provided with a pivoted turn-button, 12, so that when the filled case is inserted into the feed-trough 92 the outwardly-curved upper end of the turn-button will strike the curved edge l of the front plate of the feed-trough, and be turned sufficiently to set the cover 95 at liberty, which cover will at once be forced outward by the weight of the cartridges, and so opened as to allow the cartridges to descend into the feed-trough.

Figure 19:
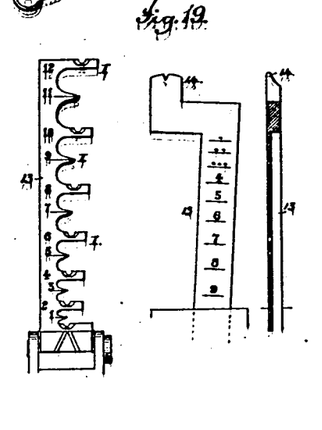
Fig. 19 illustrates improvements in the breech-sight.
Figure 20:
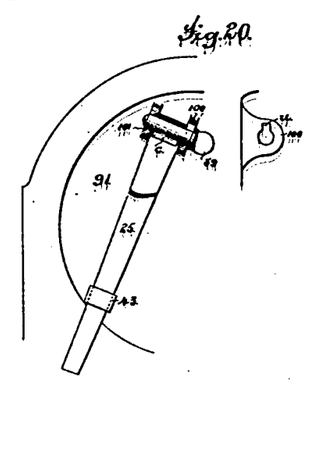
Fig. 20 illustrates in detail the mode of fastening the mainspring in place.

That the gunner may readily distinguish the points indicating the various degrees of elevation in a breech-sight adapted to indicate a multiplicity of elevations, I provide said sight with transparent indicators for said elevations. Thus, as shown in Fig. 19, this is accomplished by providing points I I I, &c., indicating such elevations, which extend sidewise from a bar, 13, supporting them. Each point is thus isolated, and enables the gunner to quickly bring any one of them within his vision without its being distracted or interfered with by the others.

In the modification shown in the same figure, the bar 13 carries a single sighting-point, 14, and has the figures indicating the various elevations cut through and through the metal, whereby they become readily visible.

The mainspring 25 consists of a bar bent upon itself so as to provide two arms, and is hung by a pivot, 89, to the door 91, so that one of its arms bears against the inner face of said door, and the other against the rear end of the firing-pin 22. This spring is provided with a square loop, 43, attached to one and embracing both arms, whereby the said spring is capable of being compressed so as to properly act upon the firing-pin and impel it forward to discharge the cartridge. This loop, however, limits the degree to which the arms of the spring may be expanded, and thus retains them under constant tension, so that the spring may be removed and introduced into its proper position while constantly compressed. These means enable the door 91 to be closed without materially compressing the spring, and likewise prevent the spring from quickly and forcibly swinging the door open when it is unlocked.

The pivot 89, securing this spring to the door 91, finds its bearings in two lugs, 100 101, projecting from the inner face of the door. It is provided with a feather, c, which is accommodated in the space between the arms of the spring, and the lug 100 is provided with a slot, u, which corresponds in shape with the feather c. When the spring is swung back into the position shown in dotted lines, Fig. 8, the slot in the lug 100 coincides in position with the feather c, and allows the pivot 89 to be withdrawn; but in any other position of the spring this feather c will abut against the inner surfaces of the lugs 100 101, and prevent the pin from being removed or from falling out. The spring can thus be readily removed for any purpose.

In the practical use of machine-guns it is sometimes desirable to dismember the gun in order to render it useless, while it is also requisite that the parts shall be capable of being dismounted for the purpose of cleaning the same.

Heretofore this has required the use of tools which have to be transported with the gun for that purpose. In order to remove the necessity of the carriage or use of tools for this purpose, the several mechanisms are so constructed and adjusted in place that most of the working parts may be taken apart without the aid of any instrument.

Upon releasing the screw 103, whose flange locks the door 91 closed, and swinging the door open, the firing-pin 22 may be freely drawn out; and by turning the mainspring into the position shown by dotted lines, Fig. 8, it may be removed, as before explained.

The crank-arm 39, through which motion is imparted to the loading and extracting mechanism, is fixed to the inner end of the crank-shaft 33 by means of a thumb-screw, 102, so that upon removing this screw the following parts are freed, so as to be readily removed.

The crank-shaft 33 may be withdrawn, which releases the crank-arm 39, worm-wheel 32, extractor 36, and the loading-plunger 19.

In machine-guns of such large size that it requires considerable power to actuate the mechanisms, the crank may be connected to the crank-shaft 33 by intermediate gearing, so proportioned that two or three turns of the crank will effect one revolution of the crank-shaft; and in small guns, such as those designed for mountain service, or where great speed of operation is desired, this gearing may be so proportioned that less than one turn of the crank shall cause one full revolution of the crank-shaft 33.

With the arrangement of said crank herein shown, these results may be effected by making the pinion 63 one-half or one-third of the size of the pinion 61, or a proportionate size larger.

In machine-guns the rear end of whose breech is closed by a hinged door, it sometimes occurs that the operator in opening the door loses his hold of the same, thus allowing the door to swing rapidly downward as far as its hinge allows. This produces a considerable strain upon the hinge and often breaks the same. To remove this danger of breakage, I provide the door 91 with a brake, as in Fig. 9, which consists of a block, 104, having a curved face fitting the knuckle of the door-hinge, which block slides in a cavity provided in the breech-piece, and is seated therein upon one or more springs, 105, which presses it forward with sufficient force to produce so much friction as is necessary to hold the door in any position in which it may be left.

I do not confine my invention to this mode of constructing the brake mechanism, as many others will accomplish the same end.

Actual experiments have determined that the angle of the cone of dispersion of the bullets of case or canister shot fired from rifled guns is determined by the pitch of the rifling. It has also been determined in like manner that all of the balls fly near the periphery or outer part of this cone. These facts prove the inefficiency of common cannon for flanking and similar purposes.

The difficulty experienced in covering a ditch or trench and the near approaches thereto by canister-shot fired from an ordinary cannon consists in the fact that the ditch or its approaches cannot be properly covered by the dangerous zone of the cone of dispersion.

Figure 24:
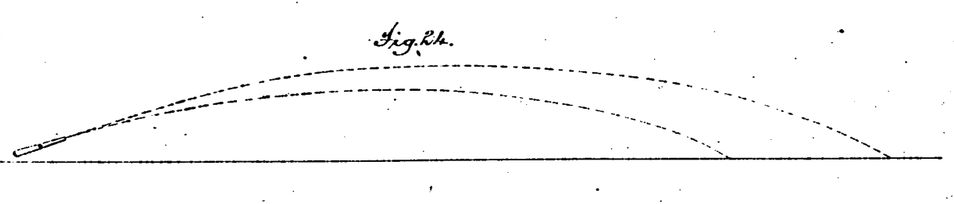
Figs. 24, 25, 26, 27, 28, 29, and 30 are diagrams illustrating the course of flight of the cones of balls resulting from the discharge of case or canister shot as fired from various guns.
Figure 25:
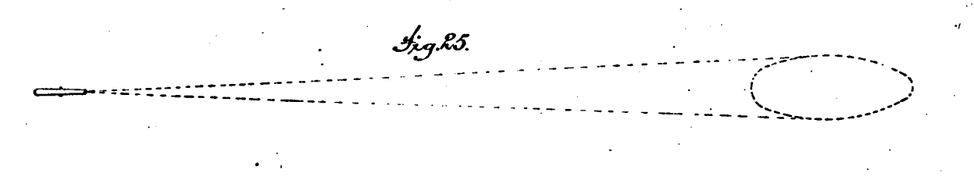

Figs. 24 and 25 show, in sectional elevation and plan views, the path of travel of the cone of dispersion of the bullets of case or canister shot fired from an ordinary cannon. As appears from said views, there is a large space not at all covered by the path of travel of the balls, in which an enemy might pass with impunity.

Figure 26:
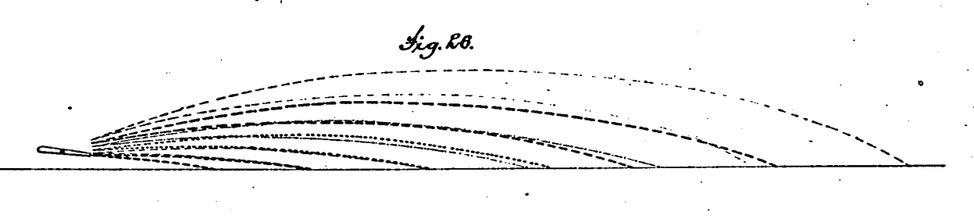
Figure 27:
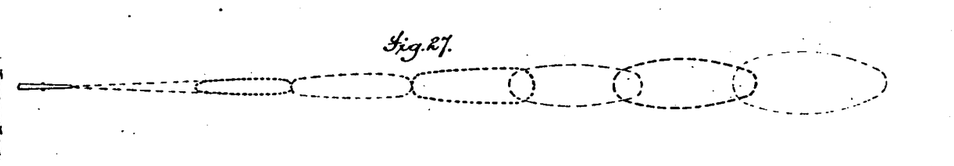

In order to cover the entire space between the longest and shortest range of such a cannon, it must be adjusted at different degrees of elevation, as is indicated by Figs. 26 and 27, which illustrate the paths of travel of the cones of dispersion of the balls of canister-shot fired from an ordinary cannon at six different elevations.

If it were possible to fire such an ordinary cannon with great rapidity, and to change its elevation with like expedition, the result indicated by Figs. 26 and 27 might be accomplished; but in that case, since the cone of dispersion of the balls would always remain the same, no matter at what elevation it is fired, the space covered at short range would be comparatively ineffectually protected.

With a machine-gun having two or more barrels automatically loaded and fired, and provided with means for changing the elevation for each barrel discharged, the result illustrated in said Figs. 26 and 27 could not only be accomplished, but would become quite effective in consequence of the rapidity of the firing.

Figure 15:
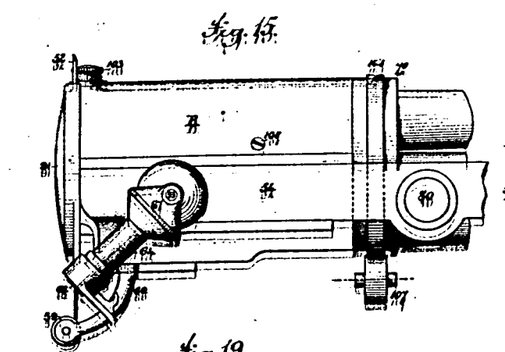
Fig. 15 is a side elevation, and Fig. 16 a cross-section, illustrating more particularly the means for automatically elevating the gun.
Figure 16:
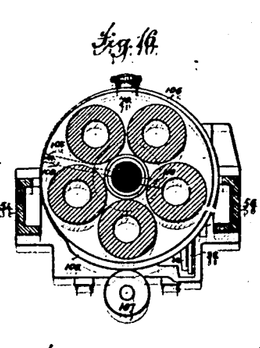
Figure 18:
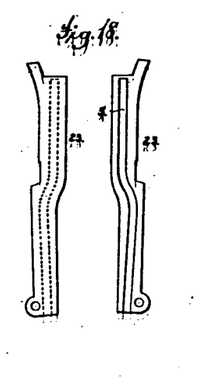
Fig. 18 illustrates an improved cartridge-feed-controlling mechanism.

In Figs. 15 and 16 is illustrated one means for changing the elevation of a machine-gun just before each barrel is fired. It consists in providing the disk 70, which supports the rear ends of and turns with the barrels, with a cam-surface, 106, which rests upon a fixed bearing or a friction-roll, as 107, supported by the carriage of the gun. This cam-surface, being properly shaped to support each barrel at a different elevation, will, as the barrels are revolved by the actuating crank-shaft 33, automatically raise them, as is apparent from an inspection of the drawing.

This feature of the invention—viz., automatically changing the elevation of a gun for each barrel discharged—is to be understood as being applicable to any machine-gun, whether the barrels of the same rotate, as herein shown, or are arranged in clusters, as in the French mitrailleuse, a suitable modification of the elevating means being made to suit the structure of the gun.

To render a gun most effective in protecting the ditch of a fortification, the approaches thereto, and generally for flanking purposes, constitutes one object of this invention.

Figure 28:
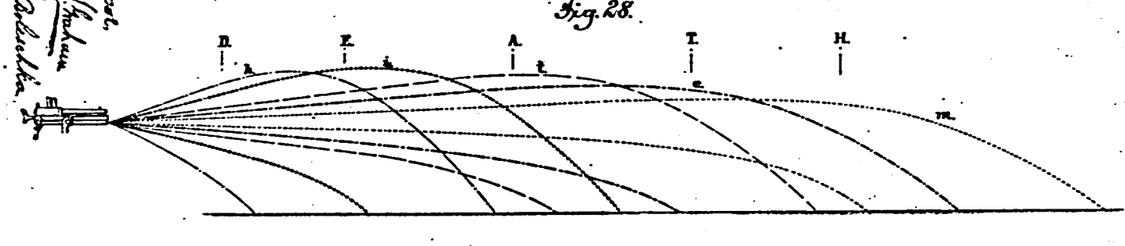
Figure 29:
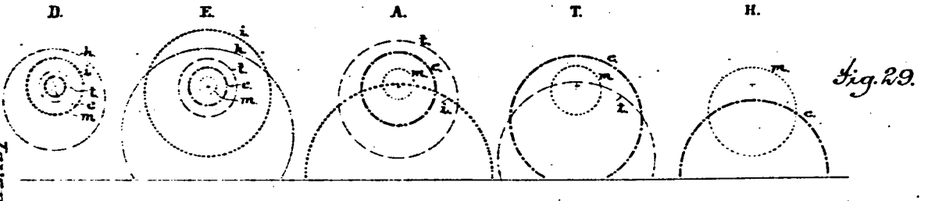
Figure 30:
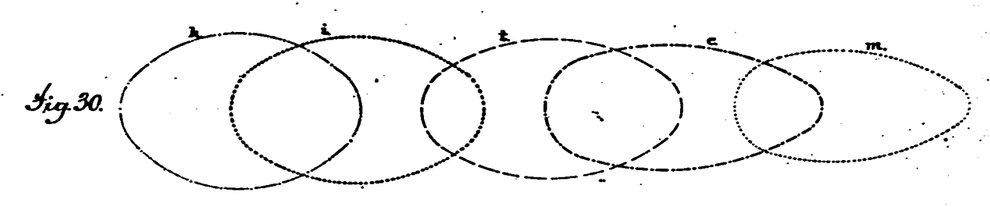

In carrying out this feature of the invention I take advantage of the fact, as demonstrated by experiments, that the bullets in their course of flight assume the form of a hollow cone, the angle of whose periphery depends upon the pitch of the rifling of the barrel, and construct a gun having two or more barrels, so that the pitch of the rifling of each barrel varies in degree. With a gun thus constructed, since the cone of dispersion of the bullets from each barrel is of different extent at different distances from the gun, and that the trajectory of each cone of bullets will also vary, it becomes evident that if the pitch of the rifling of the several barrels is properly determined any extent of space within the range of the gun may be effectively covered. This will be readily apparent from Figs. 28, 29, and 30, in which is illustrated in longitudinal and transverse sectional outline the courses of flight and surface deposit of the balls discharged from a cannon having (like that herein shown) five barrels, which barrels are each provided with rifling of a different pitch. Thus the course of the hollow cone of bullets discharged from the first barrel, supposed to be provided with rifling of a quick twist, will approximate to that marked *h*; the cone formed by the bullets discharged from the second barrel, provided with rifling of less rapid twist, will approximate to that marked *i*; the cones formed by the bullets fired from the third, fourth, and fifth barrels, each provided with rifling the pitch of whose twist diminishes in a regular degree, will approximate to the outlines *t e m*, respectively. If, now, the transverse sections taken at the various points be indicated by the lines D E A T H, it will be found that throughout the whole extent of ground covered by the longest to the shortest range, there is no vertical or horizontal space that is not adequately covered by some one or more of the cones of balls.

It is obvious that in carrying out this invention, where a gun has more than two barrels, it may, in some cases, be expedient to have one of the barrels smooth-bore.

In covering great distances, a gun provided with barrels whose rifling varies, as hereinbefore described, may be given the greatest effectiveness by providing it with the means for automatically elevating each barrel to a different degree, as has been described, thus causing the barrels to be appropriately elevated, according to the pitch of their rifling.

What is claimed is—

1. A machine-gun mounted upon a universal pivot, and provided with means, substantially as described, for training it from the shoulder.

2. The combination, with a machine-gun, of the shoulder-piece 58, substantially as described.

3. The combination, with a machine-gun, of a handle, as 50, projecting from the breech-piece in a plane below the longitudinal axis of the gun, and adapted to be grasped by one hand of the gunner, substantially as described.

4. The combination, with a machine-gun, of the shoulder-piece 58 and handle 59, substantially as described.

5. In a machine-gun, the combination, with a handle, arranged, substantially as described, at the rear thereof for elevating and depressing the gun, of a crank for actuating the gun mechanisms whose handle rotates at the rear of the breech-piece.

6. In a machine-gun, the combination, with an elevating and depressing handle, as 59, of a crank for actuating the gun mechanisms whose handle rotates at the rear of the breech-piece and sweeps in such close proximity to said handle 59 that the hand of the gunner, while grasping the latter, may intercept and stop the handle of the crank, substantially as described.

7. The combination, with a machine-gun having means for training it from the shoulder, of a crank-shaft, 33, and a counter-shaft, 62, geared together so that the crank-handle may be operated at the rear of the gun, all substantially as described.

8. The combination, with a machine-gun having means for training it from the shoulder, of the crank-shaft 33, counter-shaft 62, and intermediate connecting-pinions 61 63, all substantially as described.

9. The combination, with a machine-gun, of an extensible shoulder-piece, substantially as described.

10. The combination, with a machine-gun, of a detachable shoulder-piece, substantially as described.

11. The combination, with a machine-gun provided with means for training it from the shoulder, of a breech-sight adjustable by a movement of the hand while grasping the handle 59, substantially as described.

12. The combination, with the reciprocating breech-sight and rotating sleeve of the handle 59, of intermediate connecting mechanism converting the rotative movement of the latter into the reciprocating movement of the former, substantially as described.

13. The combination, with the rotating sleeve of the handle 59, of the sliding spring-seated shaft 51 of the breech-sight 52 and connecting-chain 68, substantially as described.

14. A breech-sight provided with perforated numerals indicating different degrees of elevation, substantially as described.

15. The combination, with the actuating crank-shaft of a machine-gun, of mechanism to produce an audible signal whereby the approach of the operating-crank to the position it occupies when the gun is fired may be ascertained, substantially as described.

16. The combination, with the crank-shaft, of the pointer 26 and indicator 27, substantially as described.

17. A machine-gun the mechanisms whereof are so constructed and arranged that each barrel, when discharged, shall stand in the central vertical plane of the longitudinal axis of the gun, and below the same, in combination with mechanism for supporting and aiming the gun from the shoulder, substantially as described.

18. The combination, with the breech-piece, of a sliding breech-sight having perforated numerals indicating different degrees of elevation, substantially as described.

19. The combination, with a machine-gun whose mechanisms are so arranged that the lowermost barrel is fired when in a central position, of a firing-pin arranged at an inclination to the axis of said barrel, so as to pass the actuating mechanisms, to co-operate therewith, substantially as described.

20. The combination, with the crank-shaft 33, worm-wheel 32, and crank-arm 39, and the mechanisms they actuate, of the thumb-screw 102, whereby said parts may be released for dismounting, substantially as described.

21. The breech-block 66, the front face whereof is constructed with an inclined cartridge-guideway, 99, extending from the recess forming the loading-chamber nearly to the lower central portion of said breech-block, substantially as and for the purpose specified.

22. The combination, with the arm of the firing-pin 22, of the cam 41, having a recess, 11, substantially as described.

23. The horizontally-vibrating cartridge-controlling gate, having a wedge-like edge, constructed and operating substantially as described.

24. The combination, with a machine-gun, of a piece, 58, having a vertical member, constructed and adapted to be engaged by the left shoulder of the gunner, substantially as described.

25. The combination, with the rotating barrels of a machine-gun, the rear ends of which are cut away to provide the ways 16 17, of a reciprocating cartridge-shell extractor provided with solid hooks 1 3, substantially as described.

26. The combination, with the cartridge-shell extractor, of the supporting-ledge 83, substantially as described.

27. The combination, with the cartridge-shell extractor, of the depending deflector or inclined projection 82, substantially as described.

28. The combination, with the door closing the breech-piece of a machine-gun, of a mainspring hinged or pivoted thereto, substantially as described.

29. The combination of the hinged door 91, mainspring 25, and firing-pin 22, substantially as described.

30. The combination, with the hinged door and firing-pin of a machine-gun, of the mainspring constructed with a loop, 43, embracing its arms and limiting their expansion, substantially as described.

31. The combination, with the mainspring 25, the pivot 89, having a feather, c, and the lugs 100 101, one of which is provided with a slot, u, substantially as described.

32. The combination, with the knuckle of the hinge of the door 91, of a sliding block seated upon a spring, 105, substantially as described.

33. A cartridge-feeding trough for machine-guns, constructed with an open center, which provides front and rear guideways, whereby the cartridge is guided by its front and rear ends only, and may be readily removed, substantially as described.

34. A cartridge-feed case the bottom of which is closed by a hinged cover, 95, locked by a turn-button, 12, behind said cover, which is constructed so as to be engaged and tripped to release the door when the case is introduced into the feeding-trough, substantially as described.

35. A machine-gun having a multiplicity of barrels, constructed so that the pitch of the rifling of each barrel varies in degree, substantially as described.

36. The combination, with a machine-gun, of a mechanism moved automatically to elevate and depress the same, substantially as described.

37. The combination, with the automatically-moved barrels of a machine-gun and the carriage supporting the same, of a cam, as 100, automatically operating to elevate and depress said barrels, substantially as described.

38. The combination, with a loading-plunger and shell-extractor, simultaneously moving in opposite directions, of an actuating mechanism, constructed substantially as described, so that while the crank-arm is continuously revolving the loading-plunger and shell-extractor have a period of rest at both extremities of their reciprocations.

39. The combination, with a loading-plunger and shell-extractor, simultaneously moving in opposite directions, of an actuating crank-arm and a carrying-yoke, the latter being constructed with a slot or opening having curved bearing-surfaces, the arcs of which have their center in the crank-shaft carrying the actuating crank-arm, substantially as described.

In testimony whereof I have signed my name to this specification in the presence of two subscribing witnesses.

B. B. HOTCHKISS.

Witnesses:
H. T. MUNSON,
GEO. H. GRAHAM.